No. 671,721. Patented Apr. 9, 1901.
F. L. DYER.
GEARING FOR AUTOMOBILES.
(Application filed Jan. 6, 1900.)
(No Model.)

Witnesses: Inventor
Frank L. Dyer

UNITED STATES PATENT OFFICE.

FRANK L. DYER, OF MONTCLAIR, NEW JERSEY, ASSIGNOR OF ONE-FOURTH TO LEONARD HUNTRESS DYER, OF WASHINGTON, DISTRICT OF COLUMBIA.

GEARING FOR AUTOMOBILES.

SPECIFICATION forming part of Letters Patent No. 671,721, dated April 9, 1901.

Application filed January 6, 1900. Serial No. 633. (No model.)

*To all whom it may concern:*

Be it known that I, FRANK L. DYER, a citizen of the United States, residing at Montclair, in the county of Essex and State of New Jersey, have invented a certain new and useful Improvement in Gearing for Automobiles, of which the following is a description.

My present invention relates to improvements in gearing for automobiles, and it is particularly designed for use with electric vehicles and with small motocycles of the De Dion-Bouton type.

The object of the invention is to provide a gearing which shall be simple and compact in construction and wherein two speed changes can be secured in a very effective manner.

My improved gearing is of such a character that the changes in speed can be effected by the movement of a single controlling-lever, and in the preferred construction the change in speed from low to high, and vice versa, will be effected gradually and without any shock or jar to the moving parts.

In order that the invention may be better understood, attention is directed to the accompanying drawings, illustrating a convenient embodiment thereof and showing gearing applied to the divided shaft or axle of a suitable vehicle.

Figure 1:
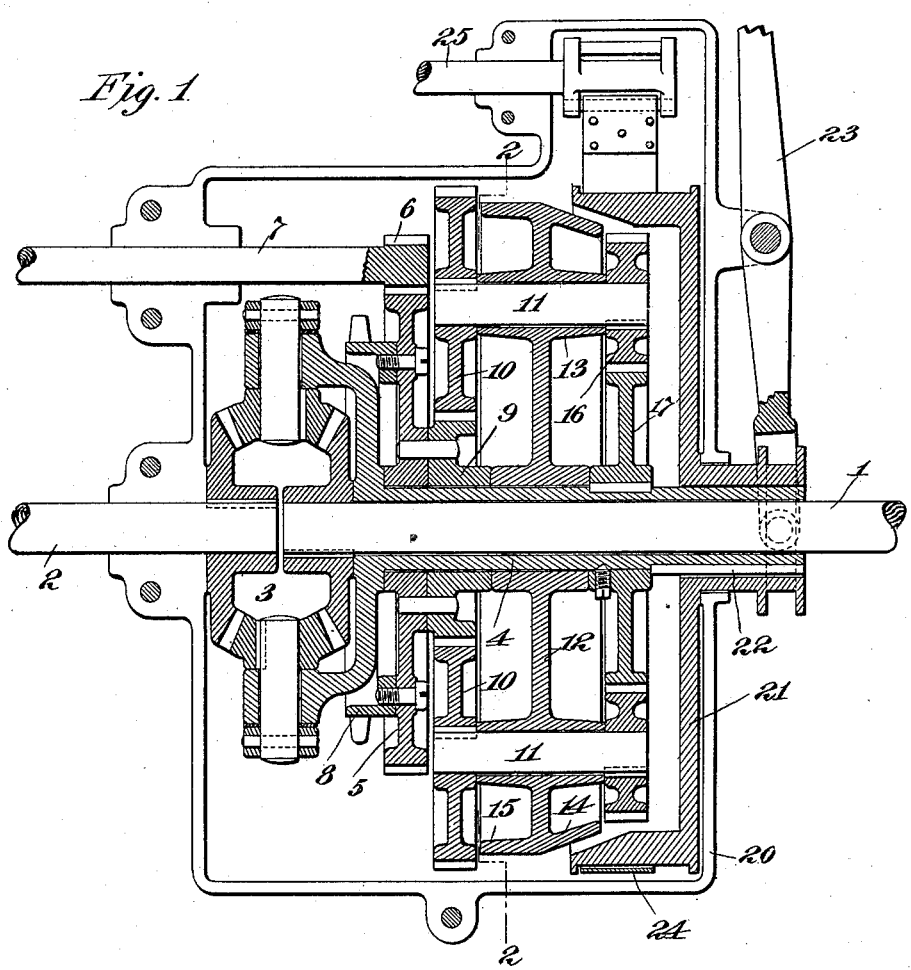
Figure 2:
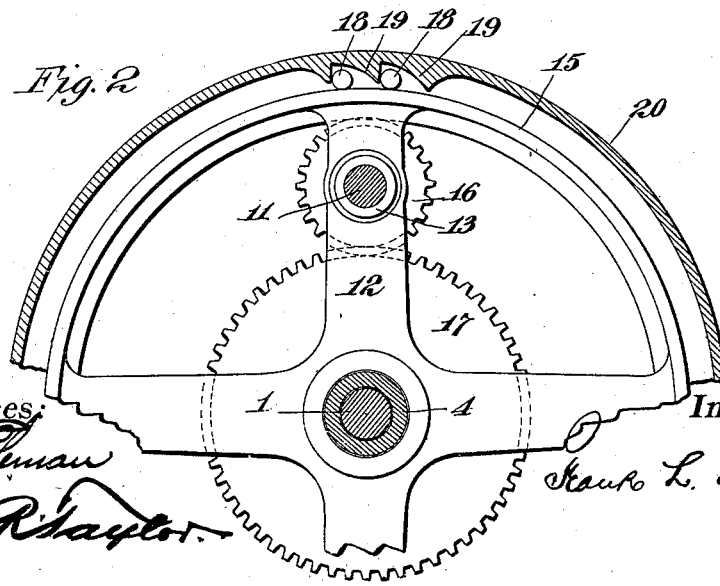

Figure 1 is a longitudinal sectional view, and Fig. 2 a cross-sectional view on the line 2 2 of Fig. 1.

In both of the above views corresponding parts are represented by the same numerals of reference.

1 and 2 represent the two sections of the driving shaft or axle of a vehicle, and 3 the usual differential by which the sectional shaft or axle is driven. The differential is connected to a sleeve 4, which is loose on the section 1 of the shaft, and mounted to turn loosely on the sleeve is a main gear 5, which may be driven from a pinion 6 on the motor-shaft 7, driven by any suitable motor. The main gear 5 may carry at one side a sprocket-wheel 8, by which the gearing may be operated manually, as is common in small gasolene-motocycles during the starting of the engine or in case of breakdown. The sprocket-wheel 8 may obviously be omitted. The main gear 5 carries a pinion 9, which also turns loosely on the sleeve 4, and said pinion engages with and drives one or more gears 10 10, each (when more than one is used) being keyed to a shaft 11, carried in a movable abutment 12. In the present instance this movable abutment is in the form of a wheel loosely carried on the sleeve 4 and having bearings 13 for the shaft or shafts 11. This wheel also carries an inclined rim 14, constituting one element of a friction-brake, and a flat rim 15, which may engage with a suitable pawl, as will be explained. Each of the shafts 11, which turn in the bearings 13, is provided on its other end with a pinion 16, keyed thereto, and each of said pinions (when more than one is used) engages with and drives a secondary gear 17, which is keyed to the sleeve 4. The relative proportion of the pinions 9 and 16 and the gears 10 and 17 is such as will give the desired power or low speed between the motor-shaft 7 and the sleeve 4. In order to prevent the abutment 12 from rotating backward, as will be explained, when the low-speed gearing is in operation, any suitable form of pawl may be used, either a click or friction pawl. The latter is preferable owing to absence of noise.

In Fig. 2 I illustrate two rollers 18, which coöperate with inclined surfaces 19, formed in the casing 20, which surrounds the gearing, said rollers coöperating with the smooth rim 15 of the abutment 12 to form a friction-pawl of a very common type. When the abutment 12 turns in one direction, the rollers 18 will be drawn away from the inclined surfaces 19; but if said abutment tends to turn in the opposite direction the rollers 18 will be jammed against the inclined surfaces 19 to prevent movement of said abutment.

In operation it will be observed that the motor-shaft 7 turning the pinion 6 will rotate the gear 5 loosely on the sleeve 4, and through the pinion 9 and gears 10 the shaft or shafts 11 will be rotated. The rotation of the shafts 11 turning the pinions 16 will rotate the secondary gear 17, which is connected to the sleeve 4, the latter being connected to the driven shaft of the vehicle through the differential 3. Assuming the proportion of gears illustrated to be used, with the pinion 9 of the same diameter as the gears 10 and the pinion 16 of one-half the diameter of the secondary gear 17, it will be observed that the sleeve 4 will turn in the same direction as the primary gear 5, but at one-half the speed thereof. When the high speed of the gearing is desired, it becomes only necessary to connect the abutment 12 with the sleeve 4, so as to thereby lock the pinion 9 with respect to the gears 10 and the pinion 16 with respect to the secondary gear 17, causing all of these parts to turn together, the effect being the same as if the primary gear 5 were connected directly to the sleeve 4, and the friction-pawl permitting the abutment to turn in the forward direction. This result may be secured in any suitable way—as, for instance, by using a friction-clutch 21, which is connected to the sleeve 4 by means of a feather 22, whereby said clutch may be moved longitudinally on the sleeve. The friction-clutch 21 is adapted to engage with the tapered surface 14 of the abutment 12, so as to lock the said abutment to the sleeve 4. The friction-clutch 21 may be operated in any suitable way—as, for instance, by a lever 23, pivoted on the outside of the casing 20. The friction-clutch 21 being connected directly to the sleeve 4, which in turn is connected to the driving-shaft of the axle, offers a convenient element to which to apply the usual brake 24, as shown. This may be an ordinary band-brake, which may be operated from a rock-shaft 25, as is common. The surface of the friction-clutch 21 is sufficient in extent to permit the band-brake 24 to engage therewith in any position to which the said clutch may be moved.

Having now described my invention, what I claim as new, and desire to secure by Letters Patent, is as follows:

1. In a gearing of the class described, the combination of a driving-shaft, a driven shaft, a primary gear loose on the driven shaft, a connection between the primary gear and the driving-shaft, a secondary gear connected to the driven shaft, a movable abutment, gearing carried by said abutment and connecting the primary and secondary gears, means for locking the abutment to the driven shaft, and a pawl coöperating with said abutment for preventing return movement thereof but permitting forward movement with the driven shaft, substantially as set forth.

2. In a gearing of the class described, the combination of a driving-shaft, a driven shaft, a primary gear loose on the driven shaft, a connection between the primary gear and the driving-shaft, a secondary gear connected to the driven shaft, a movable abutment, gearing carried by said abutment and connecting the primary and secondary gears, a friction-clutch connected with the driven shaft for engaging said abutment, and a pawl coöperating with said abutment for preventing return movement thereof but permitting forward movement with the driven shaft, substantially as set forth.

3. In a gearing of the class described, the combination of a driving-shaft, a driven shaft, a primary gear loose on the driven shaft, connections between the primary gear and the driving-shaft, a secondary gear connected to the driven shaft, a disk-like abutment movable with respect to the driven shaft concentric therewith and between the primary and secondary gears, a shaft carried by said abutment, a pinion carried by the primary gear, gears carried by the extremities of the abutment-shaft engaging the primary pinion and the secondary gear, means for locking said abutment to the driven shaft, and a pawl for preventing backward movement of said abutment but permitting forward movement thereof, substantially as set forth.

4. In a gearing of the class described, the combination of a sectional driven shaft, a differential connecting the sections thereof, a sleeve loose on one section of the shaft and connected to said differential, a primary gear loose on said sleeve, a driving-shaft connected with said primary gear, a secondary gear connected to said sleeve, a movable abutment loose on said sleeve, gearing carried by said abutment connecting the primary and secondary gears, means for locking the sleeve to said abutment, and a pawl for preventing backward movement of said abutment but permitting forward movement thereof, substantially as set forth.

5. In a gearing of the class described, the combination of a driving-shaft, a driven shaft, a primary gear loose on the driven shaft, a connection between the primary gear and the driving-shaft, a secondary gear connected to the driven shaft, a movable abutment, gearing carried by said abutment and connecting the primary and secondary gears, means for locking the abutment to the driven shaft, and a sprocket-wheel connected to said primary gear, substantially as set forth.

This specification signed and witnessed this 3d day of January, 1900.

FRANK L. DYER.

Witnesses:
ARCHIBALD G. REESE,
JNO. R. TAYLOR.